United States Patent [19]
Noel et al.

[11] Patent Number: 5,044,765
[45] Date of Patent: * Sep. 3, 1991

[54] OPTICAL HEAT FLUX GAUGE

[75] Inventors: Bruce W. Noel, Espanola, N. Mex.; Henry M. Borella, Santa Barbara, Calif.; Michael R. Cates, Oak Ridge, Tenn.; W. Dale Turley, Santa Barbara, Calif.; Charles D. MaCarthur, Clayton; Gregory C. Cala, Dayton, both of Ohio

[73] Assignee: United States Department of Energy and United States Department of Air Force, Washington, D.C.

[*] Notice: The portion of the term of this patent subsequent to Jun. 25, 2008 has been disclaimed.

[21] Appl. No.: 572,065

[22] Filed: Aug. 24, 1990

Related U.S. Application Data

[60] Div. of 362,541, June 6, 1989.

[51] Int. Cl.[5] .............................................. G01K 17/00
[52] U.S. Cl. ........................................ 374/29; 374/30
[58] Field of Search ...................... 374/29, 30, 31, 43, 374/44, 161

[56] References Cited

U.S. PATENT DOCUMENTS

| | | | |
|---|---|---|---|
| 3,939,706 | 2/1976 | Pinson | 250/352 |
| 4,309,901 | 2/1982 | Rolinski | 73/147 |
| 4,568,198 | 2/1986 | Szabo et al. | 374/29 |
| 4,577,976 | 3/1986 | Hayashi | 374/30 |
| 4,722,609 | 2/1988 | Epstein et al. | 374/30 |
| 4,779,994 | 10/1988 | Diller | 374/30 |

OTHER PUBLICATIONS

Bruce W. Noel et al., "A Proposed Method for Remote Thermometry and Turbin Engine," Los Alamos National Laboratory Document LA-UR-85-2379 (submitted to AIAA/SAE/ASME 21st Joint Propulsion Conference, Monterey, CA, July 8-10, 1985).

Bruce W. Noel et al., "Proposed Laser-Induced Fluorescence Method for Remote Thermometry in Turbin Engines," Los Alamos National Laboratory document LA-UR-86-1010 (submitted to Journal of Propulsion and Power) (no date).

Bruce W. Noel et al., "The Design and Characterization of a Prototype Optical Heat-Flux Gauge," Los Alamos National Laboratory document LA-1140-8-MS, Issued Jan. 1989, (submitted at a conference Jun. 7, 1989).

Primary Examiner—William A. Cuchlinski, Jr.
Assistant Examiner—Diego F. F. Gutierrez
Attorney, Agent, or Firm—Milton D. Wyrick; Paul D. Gaetjens; William R. Moser

[57] ABSTRACT

A heat flux gauge comprising first and second thermographic phosphor layers separated by a layer of a thermal insulator. The gauge may be mounted on a surface with the first thermographic phosphor in contact with the surface. A light source is directed at the gauge, causing the phosphors to luminesce. The luminescence produced by the phosphors is collected and its spectra analyzed in order to determine the heat flux on the surface. First and second phosphor layers must be different materials to assure that the spectral lines collected will be distinguishable.

6 Claims, 5 Drawing Sheets

OPTICAL HEAT FLUX GAUGE

This is a division of application Ser. No. 362,541, filed June 7, 1989.

BACKGROUND OF THE INVENTION

This invention relates generally to the measurement of heat flux, that is the measurement of the amount of heat transferred across a surface per unit area per unit time, and, more specifically, to the measurement of heat flux utilizing the optical properties of thermographic phosphors. The invention is a result of a contract with the Department of Energy (Contract No. W-7405-ENG-36).

The measurement of heat flux is important in many experimental situations, such as those where heat transfer must be limited and therefore monitored. For example, accurate measurement of heat-transfer rates is considered critical to the design improvements envisioned for high-pressure turbine engines. Improved understanding of the effects that contribute to heat load can lead to increased efficiency. Of particular interest is the heat transferred from the free-stream gas to an engine component surface. Examples include turbine blades and vanes.

Previous heat flux gauges have principally involved some form of resistance thermometer temperature sensor applied on both sides of an insulating medium as conducting surfaces. These conducting surfaces can also be made from pairs of materials in a thermocouple configuration. Leads connected to these surfaces would carry an electrical current which is proportional to the surface temperature detected by the sensor to an external instrument which would measure the temperatures of the surfaces. A typical gauge is made by depositing thin layers of an electrically and thermally conductive material onto both sides of a thin sheet of insulating material such as Mylar$^R$ or Kapton$^R$.

Heat flux, Q, incident on an ideal gauge made in this way is given by the following equation:

$$Q = k(\text{delta } T)/L; \quad \quad 10$$

where k is the thermal conductivity of the insulator, L is the thickness of the insulator, and delta T is the temperature difference between the two conductive surfaces. This equation assumes that the conductive surfaces are infinitely conducting and infinitely thin.

Modern embodiments of this configuration are disclosed in U.S. Pats. No. 4,779,994, 4,722,609, and 4,577,976.

U.S. Pat. No. 4,779,994 to Diller, et al. discloses a fairly conventional heat flux gauge which utilizes thin film layers applied to each side of a planar thermal resistance element, with its "cold" junctions applied to one surface and its "hot" junctions applied to the other. The use of thin films allows the deposition of a large number of junctions onto a small surface area which can be interconnected in series. Of course, these junctions are of the electrical resistance type, and require electrical connections.

U.S. Pat. No. 4,722,609 to Epstein et al. discloses a double sided, high-frequency response heat flux gauge consisting of a metal film approximately 1500 Angstroms thick applied to both sides of a thin (25 micrometer) polyimide sheet. At low frequencies, the temperature difference across the polyimide is a direct measure of the heat flux. At higher frequencies, a quasi-one-dimensional assumption is used to infer the heat flux. Numerous such gauges are arranged in a serpentine pattern and applied to the surface of a turbine blade.

Yet another thin film heat flux gauge is disclosed in U.S. Pat. No. 4,577,976 to Hayashi et al. wherein a pair of metallic thin films are attached to opposite surfaces of a heat resistive thin film. The heat flux through the heat resistive film is determined by measuring the temperature gradient therein while using the metallic thin films as resistance thermometer elements.

The pervading problem plaguing the above heat flux gauges, as well as all prior art heat flux gauges, is that they are electrically based. Thus, they all require connecting wires of some type in order to operate. This complicates their use, and severely limits their application to rotating components, as wire connections would have to be through slip rings. This severely complicates such an application, and greatly detracts from its reliability.

Connecting leads or wires of the prior art also limit the spatial resolution when multiple heat flux gauges are needed to measure the spatial distribution of heat flux. The degree of complication, because of the inherent geometry of such electrically based gauges, effectively precludes their use in measuring the spatial distribution of heat flux with acceptable resolution and areal coverage. Wiring dozens of gauges is complicated and interferes with the natural heat transfer to or from the surface under test. Connecting wires also present problems when such gauges are used in hostile environments.

The current invention solves the problems of the prior art by providing a leadless heat flux gauge that uses light instead of electrical means as its interrogating medium. The sensing elements of the gauges are thermographic phosphors, whose emission lines in the luminescence spectrum are temperature dependent. This allows accurate temperature determination when the phosphors are interrogated by ultraviolet light, and the spectral lines of the emitted light is analyzed. It also allows for a heat flux gauge requiring no electrical connections between the gauge and the associated evaluation and display equipment.

It is therefore an object of the present invention to provide apparatus for the accurate measurement of heat flux.

It is another object of the present invention to provide a heat flux gauge that does not require electrical connections.

It is still another object of the present invention to provide a heat flux gauge that will operate in a hostile environment.

It is still another object of the present invention to provide a heat flux gauge that is interrogated with light.

Additional objects, advantages and novel features of the invention will be set forth in part in the description that follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a multilayer heat flux gauge for measuring heat flux on a surface comprising first and second thermographic phosphor films separated by an insulating medium and bonded to the surface. Light means focused on the first and second phosphor films produce emitted light indicative of the temperature of the first and second phosphor films. Interpreting means receive the emitted light and produce an output indicative of the heat flux on the surface.

In another aspect of the present invention, and in accordance and purposes, an optically interrogated gauge for measuring heat flux incident on a plurality of points on a surface may comprise a plurality of first thermographic phosphors in direct contact with the surface with a plurality of second thermographic phosphors overlying and spaced apart from the plurality of first thermographic phosphors. Thermal insulating means are located between the plurality of first thermographic phosphors and the plurality of second thermographic phosphors for thermally isolating the plurality of first thermographic phosphors from the plurality of second thermographic phosphors. Light means are incident on the plurality of first thermographic phosphors, for producing first luminescence from each of the first plurality of thermographic phosphors and second luminescence from each of the plurality of second thermographic phosphors, wherein the first luminescence and the second luminescence are indicative of the temperatures of the first and second thermographic phosphors at a plurality of points on the surface.

In a still further aspect of the present invention, an optically interrogated gauge for measuring heat flux incident on a plurality of points on a surface may comprise a plurality of first thermographic phosphors in direct contact with the surface and a plurality of second thermographic phosphors spaced above, but juxtaposed in relation to the plurality of first thermographic phosphors. Thermal insulating means are located between the plurality of first thermographic Phosphors and the plurality of second thermographic phosphors for thermally isolating the plurality of first thermographic phosphors from the plurality of second thermographic phosphors. Light means incident on the plurality of first thermographic phosphors and on the plurality of second thermographic phosphors, produce first luminescence from each of the plurality of first thermographic phosphors and second luminescence from each of the plurality of second thermographic phosphors, wherein the first luminescence and the second luminescence are indicative of the temperatures of the first and second thermographic phosphors at a plurality of points on said surface.

In a still further aspect of the present invention, and in accordance with its objects and purposes, a method of determining heat flux on a surface may comprise focusing a light source on first and second thermographic phosphor films separated by an insulating medium and bonded to the surface; interpreting the light emitted from the first and second phosphor films to determine the temperature of the phosphor films and the heat flux on the surface; producing an output indicative of the heat flux on the surface.

BRIEF DESCRIPTION OF THE DRAWINGS

The accompanying drawings, which are incorporated into and form a part of the specification, illustrate embodiments of the present invention and, together with the description, serve to explain the principles of the invention. In the drawings.

DETAILED DESCRIPTION

Figure 1:
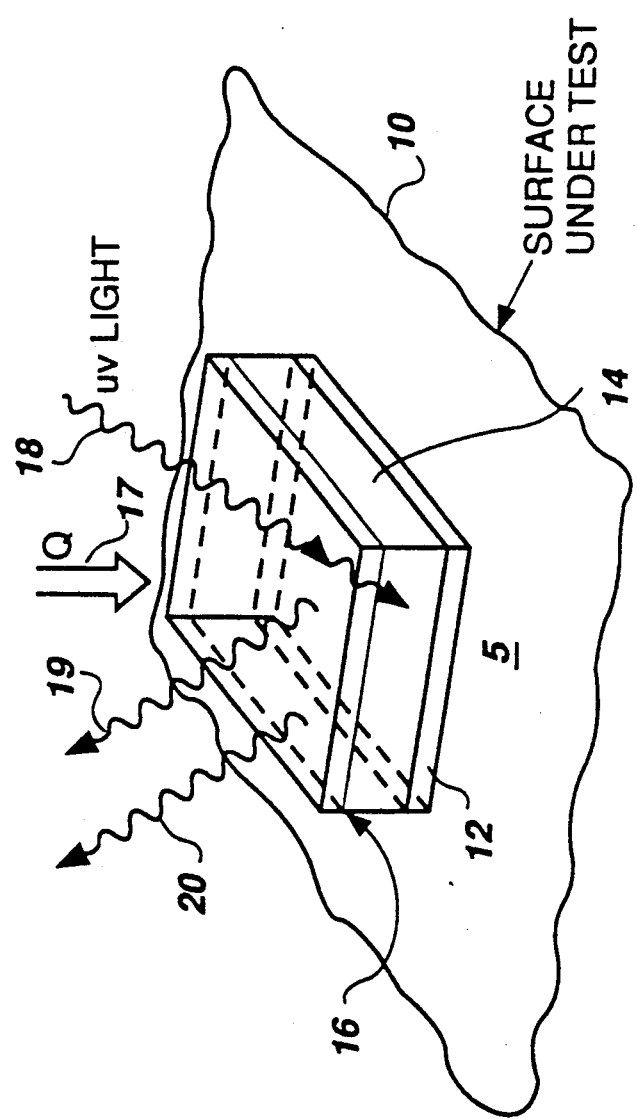
FIG. 1 is an enlarged schematic drawing of a phosphor heat flux gauge according to the present invention.

The present invention allows accurate determination of heat flux on a surface without need for electrical connections through the use of multiple layers of thermographic inorganic phosphors applied to both sides of a thermal insulator. The phosphors are interrogated with light to determine the heat flux. The invention can be best understood by referring to the drawings. In FIG. 1, a heat flux sensor according to the present is illustrated as an enlarged schematic wherein surface under test 10 has attached to it the assembly comprising first thermographic phosphor layer 12, insulative layer 14, and second thermographic phosphor layer 16, which together comprise sensor 5. Also shown is light source 18, and emissions 19. 20 from first thermographic phosphor layer 12 and second thermographic phosphor layer 16 respectively. Heat flux, Q, incident on surface 10. is illustrated by arrow 17.

To insure that incident heat flux 17 can be accurately determined, it is necessary that first thermographic phosphor layer 12 comprise a thermographic phosphor different than the thermographic phosphor which comprises second thermographic phosphor layer 16. This is so that the different materials will exhibit different spectral Tines for the same or different temperatures of layers 12, 16.

The choice of the materials for first thermographic phosphor layer 12 and second thermographic phosphor layer 16 initially involves choosing thermographic phosphors which have high rates of change in emission spectra over the temperature range of interest for surface 10. Presently, thermographic phosphors are available over the range of ° K to 2600° K.

Insulative layer 14 may be any thermal insulator material that is suitable for a particular application. That is, it must be transparent at all of the involved wavelengths, it should contribute minimal background luminescence, and, depending on the intended application, it may need to have a high melting point. In one embodiment, insulative 14 is polymethylpentene (PMP). PMP is highly transparent at one of the desirable excitation wavelengths for phosphor (254 nm), contributes a comparably minimal amount of background luminescence between 400 nm and 620 nm, and has a reported melting point of 455° F. One problem with many of the currently available thermal insulator materials is that they will melt at very high temperatures. It is for this reason that currently glass would be the material of preference for very high temperature applications.

Light source 18, in one embodiment, will be an ultraviolet light source focused on sensor 5. With an ultraviolet light source it will be necessary to choose one having high efficiency, and accuracy. It should operate at a wavelength which will most efficiently excite the desired spectral lines of the phosphors. A wavelength that is acceptable for many applications, and that is readily available from commercially available UV lamps such as a mercury arc lamp, is 254 nm. Of course, any light source that can produce a wavelength slightly shorter than the shortest wavelength emission line of the phosphor can be used to produce emissions 19, 20.

Emissions 19, 20 contain sufficient information through interpretation of their spectral lines to determine the temperatures of first thermographic phosphor layer 12 and second thermographic phosphor layer 16. With the temperature information, the heat flux, Q, can be calculated using equation 10.

Figure 2:
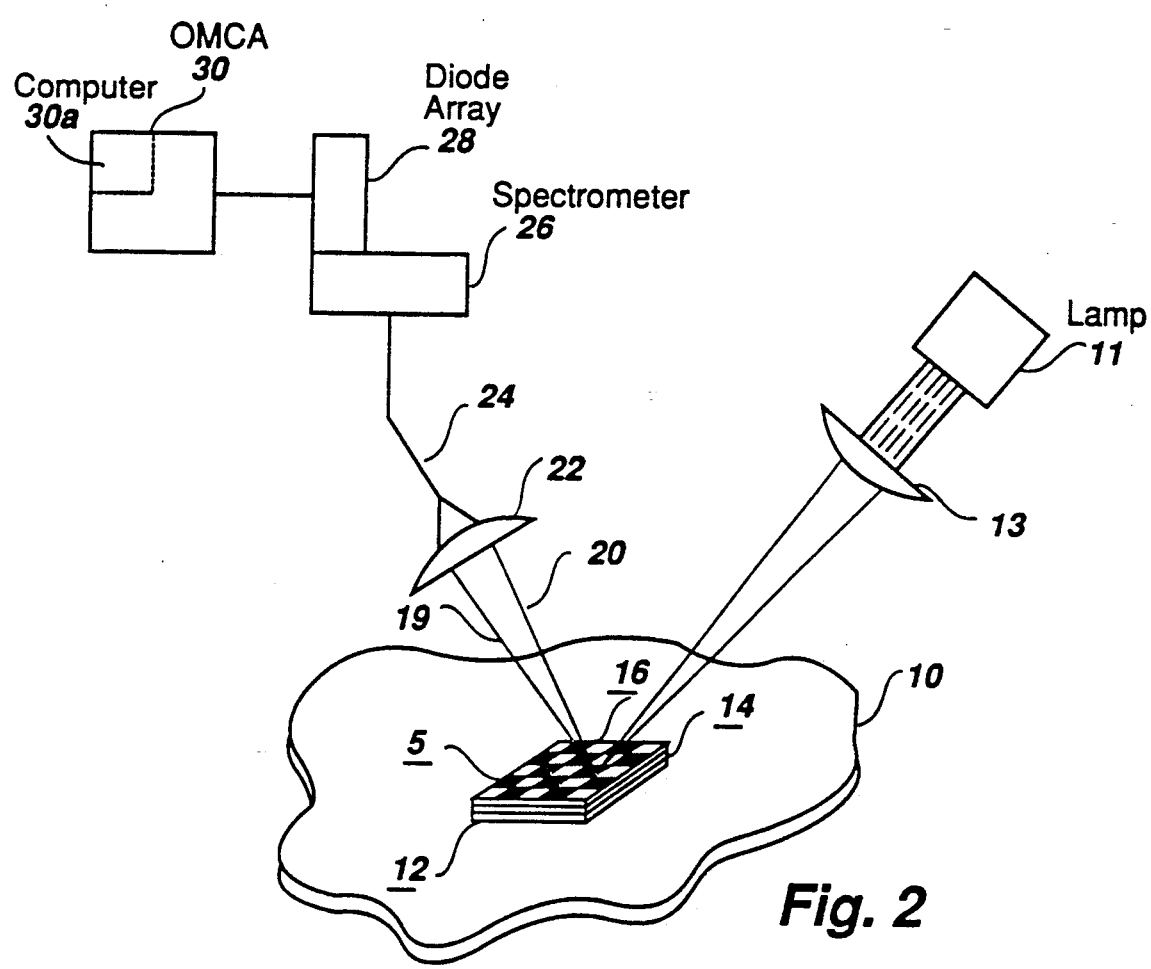
FIG. 2 is a schematic representation of a possible practical configuration for application of the present invention.

One embodiment of a means for collecting and interpreting emissions 19, 20 is illustrated in FIG. 2. Referring to FIG. 2, light from lamp is focused by lens 13 onto the top surface of sensor 5. As a result, emissions 19, 20, being phosphor luminescence, are emitted from sensor 5, are collected by lens 22 and inserted into optical fiber 24 for transmission into spectrometer 26 through a lens coupler (not shown).

Sensor 5, if an integral unit, can be attached to surface 10 using any high thermal conductivity epoxy. Alternatively, using an air brush (not shown), first thermographic phosphor layer 12 could be deposited as a thin layer directly onto surface 29, with a thin layer of insulator 14 deposited on first thermographic phosphor layer 12. Second thermographic phosphor layer 16 would then be deposited as a thin layer on top of insulative layer 14. If desired for protection of sensor 5, a thin layer of a plastic material having high thermal conductivity could be deposited over second thermographic phosphor layer 16. It is important that the phosphor layers 12, 16 be thin enough to be thermally insignificant and to permit a substantial portion of light from lamp 11 to pass through layer 16 to layer 12. If sensor 5 is to be an integral unit, it is also convenient to apply phosphor layers 12, 16 to insulative layer 14 is with an air brush. With the air brush, the layers may be applied using acetone containing a small quantity of dissolved adhesive as a carrier.

In spectrometer 26 the luminescence signal is dispersed and collected on diode array 28, which, for example, may be an EG&G Reticon$^R$ diode array. The data from diode array 28 is recorded and processed according to equation 10 by optical multichannel analyzer 30, which may be an EG&G model 1460 optical multichannel analyzer. Optical multichannel analyzer (OMCA) 30, having internal computer 30a, is a commercially available instrument, and converts light incoming on optical fiber 24 into electrical signals. These electrical signals are then analyzed by internal computer 30a to determine the heat flux according to equation 10, using the temperature differences between phosphor layer 12 and phosphor layer 16, and the predetermined thickness and thermal conductivity of insulative layer 14.

Figure 3:
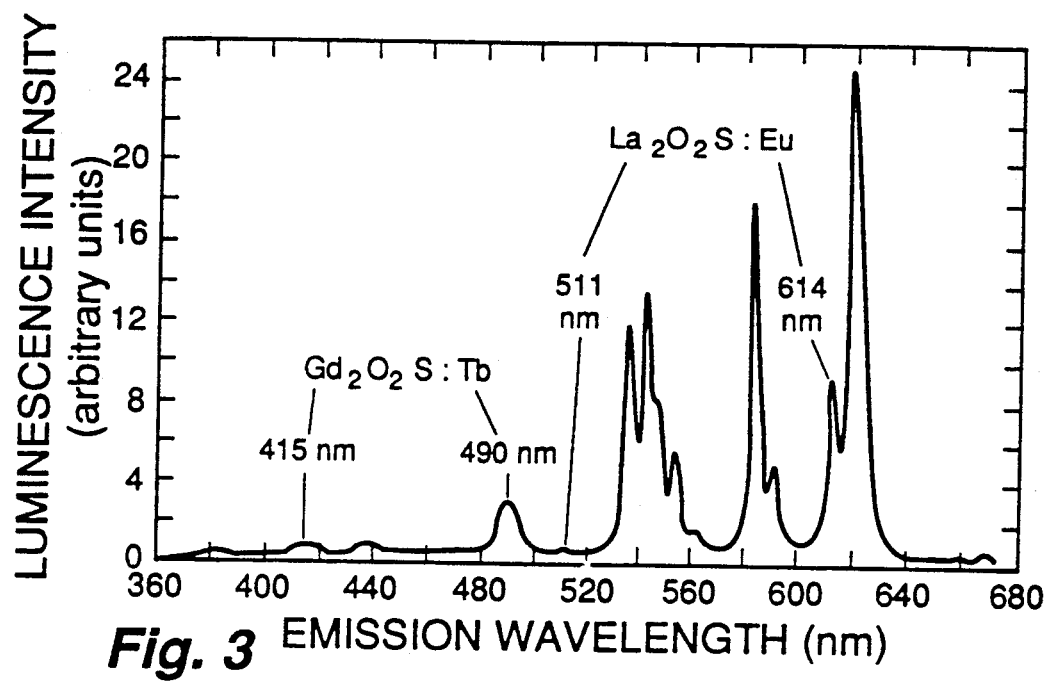
FIG. 3 shows the luminescence spectra for a $Gd_2O_2S:Tb$ phosphor layer and a $La_2O_2S:Eu$ phosphor layer operating at 51° F.

Typical results obtained from analyzer 30 are illustrated in FIG. 3. The emission lines at 415 nm and 490 nm are from a $Gd_2O_2S:Tb$ phosphor layer 12 (FIG. 1). The emission lines at 511 nm and 614 nm are from a $La_2O_2S:Eu$ phosphor layer 16 (FIG. 1). These results are with the gauge operating at 51° F. A spectrum such as this is used to calibrate the gauge by determining luminescence intensity for each layer 16 at several known temperatures.

Figure 4:
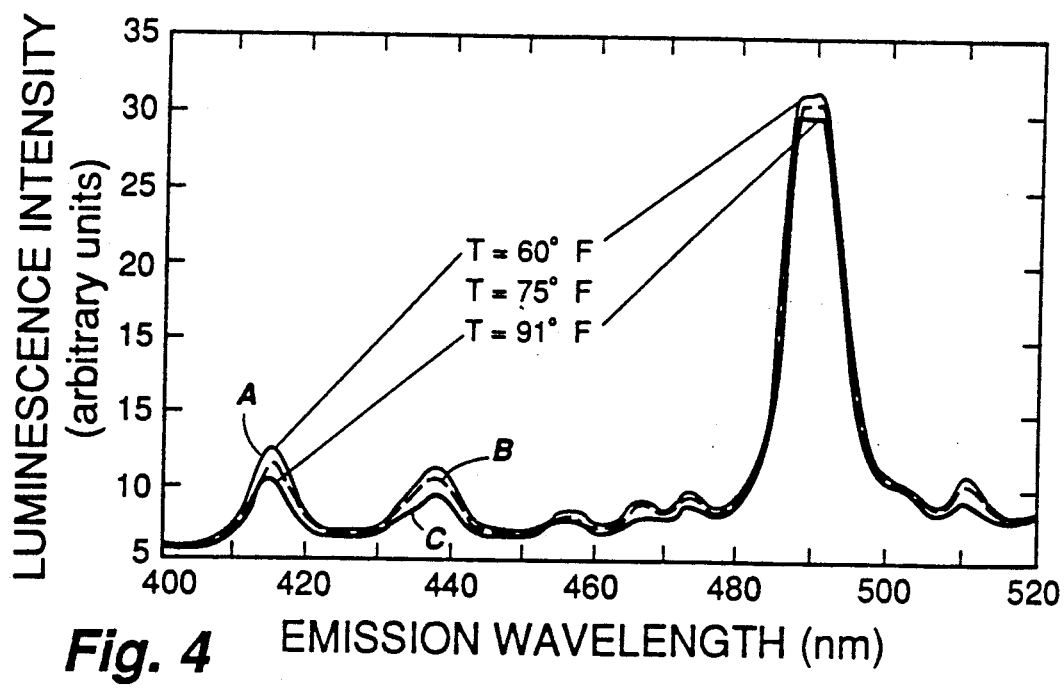
FIG. 4 is another luminescence spectra of $Gd_2O_2S:Tb$ and $La_2O_2S:Eu$ phosphor layers operating at 60° F., 75° F. and 91° F.

To calibrate the gauge, it is necessary to maintain the same temperature at both phosphor layers 12, 16. With this accomplished, the curves shown in FIG. 4 were obtained for the wavelength range of 400 D nm to 520 nm. Curve A, shown as a light solid line, is for a temperature of 60° F.; curve B, shown as a dashed line, is for a temperature of 75° F.; and curve C, shown as a heavy solid line, is for a temperature of 91° F.

Figure 5:
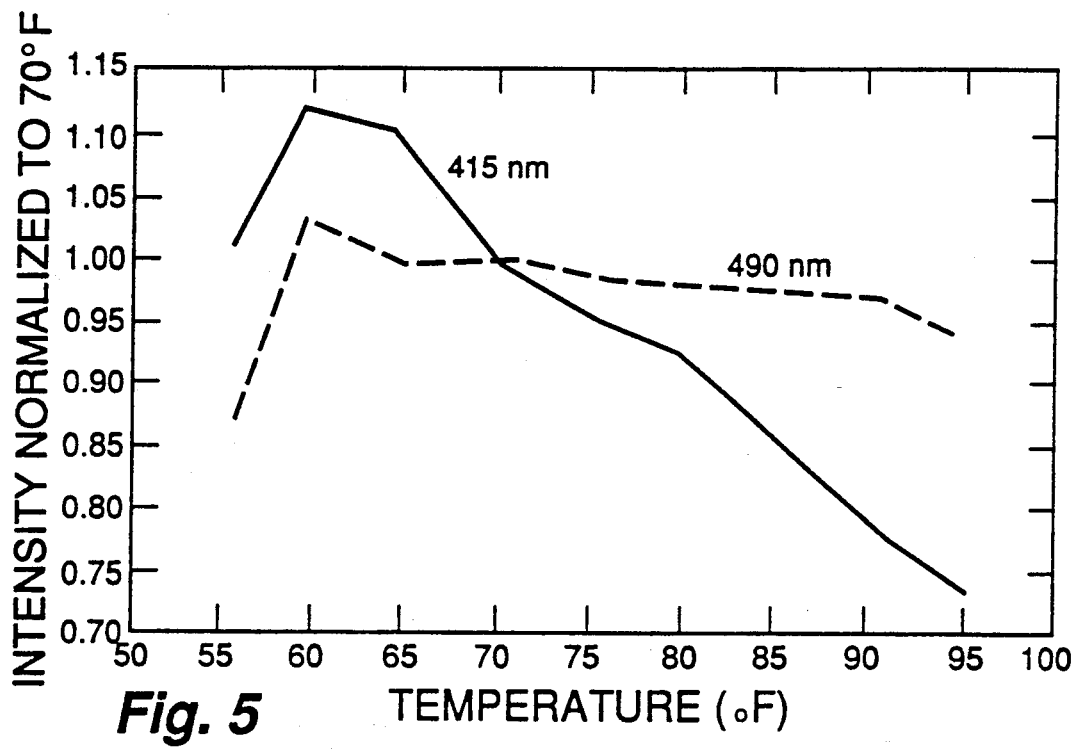
FIG. 5 contains plots of luminescence intensity for a $Gd_2O_2S:Tb$ phosphor layer at the 415 nm and 490 nm lines normalized to 70° F.
Figure 6:
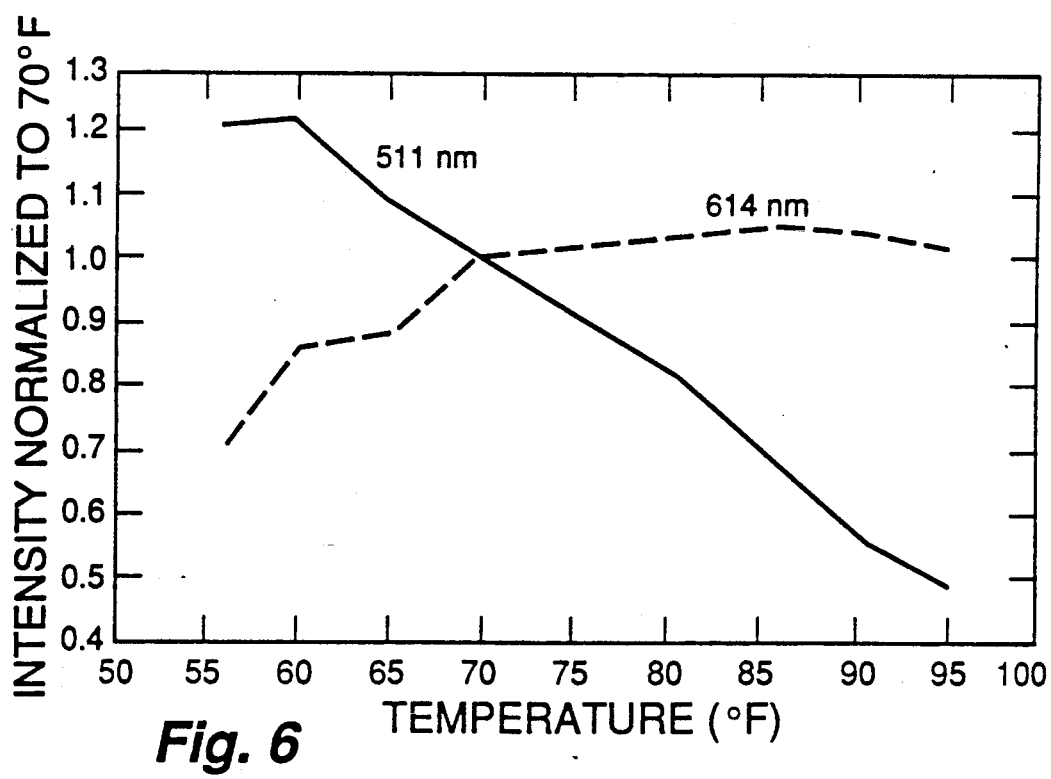
FIG. 6 contains plots of luminescence intensity for a $La_2O_2S:Eu$ phosphor layer at the 511 nm and 614 nm lines normalized to 70° F.

The data thus obtained were normalized to the integrated intensity at 70° F. Intensity values were calculated by integrating the luminescence spectrum over a selected bandwidth. FIGS. 5 and 6 present intensity ratios versus temperature for the key emission lines in $La_2O_2S:Eu$ and $Gd_2O_2S:Tb$ respectively. The continuum luminescence dilutes the temperature sensitivity and the accuracy of these bands. By integrating above a line connecting the extremes of the chosen bandwidth, the continuum is removed and the temperature, sensitivity and accuracy are increased. For $La_2O_2S:Eu$ (FIG. 6), the 511 nm line decreases rapidly between 70° F. and 95° F., whereas the reference line at 614 nm increases slightly. With $Gd_2O_2S:Tb$ (FIG. 5), the 415 nm line is the more sensitive in the temperature range of interest.

Figure 7:
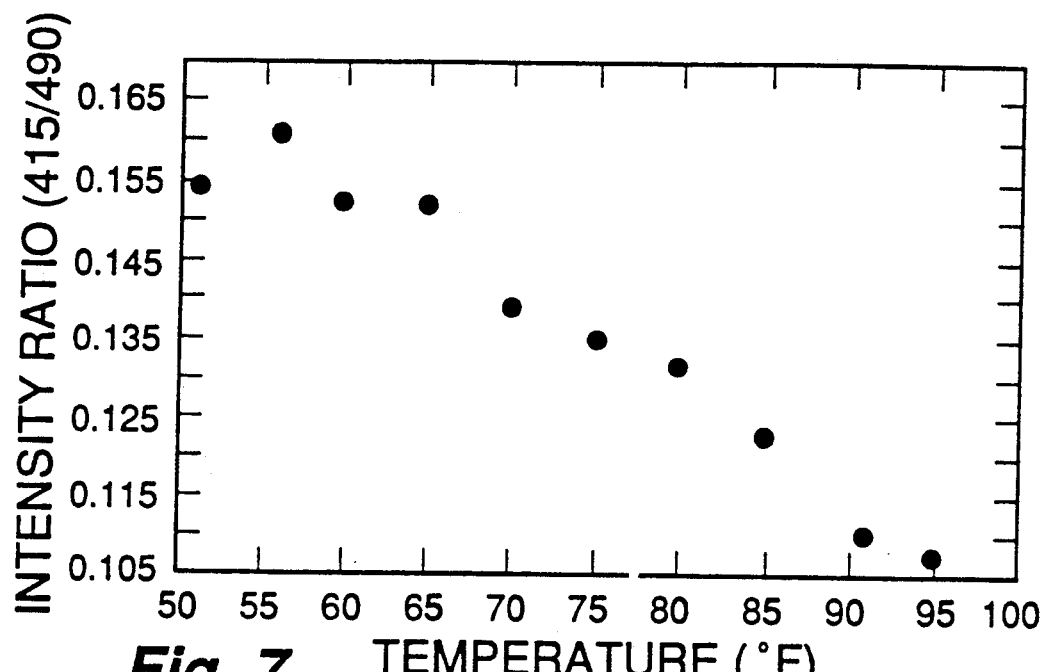
FIG. 7 is a plot of intensity ratio versus temperature (° F.) for the 415 nm/490 nm peak ratios of a $Gd_2O_2S:Tb$ phosphor layer.
Figure 8:
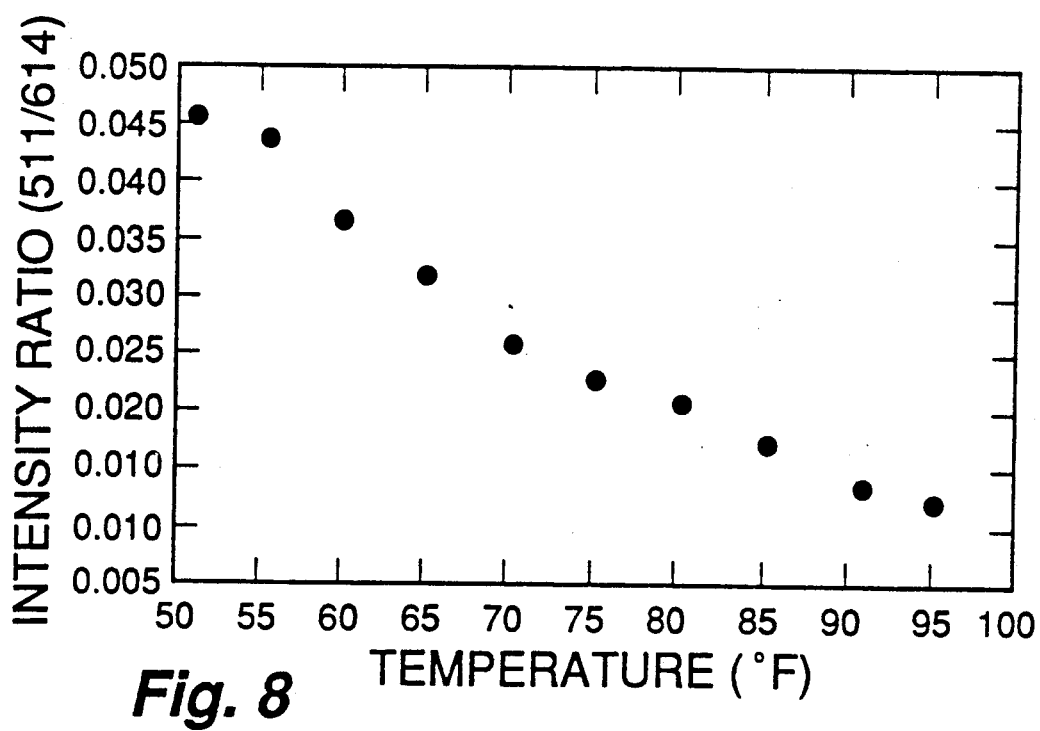
FIG. 8 is a plot of intensity ratio versus temperature (° F.) for the 511 nm/614 nm peak ratios of a $La_2O_2S:Eu$ phosphor layer.

The ratios of the integrated intensities obtained from FIGS. 5 and 6 (415/490 and 511/614 respectively) are plotted against temperature to produce calibration curves for the gauge. The curve for $Gd_2O_2S:Tb$ (415/490) is illustrated in FIG. 7, and the curve for $La_2O_2S:Eu$ (511/614) is illustrated in FIG. 8. In the temperature range between 70° F. and 95° F., $La_2O_2S:Eu$ is a more sensitive thermometer than $Gd_2O_2S:Tb$. In this range, the $La_2O_2S:Eu$ (511/614) peak ratio changes at an average rate of 3.3% per ° F., whereas the $Gd_2O_2S:Tb$ (415/490) ratio changes at a rate of 0.83% per ° F. After the gauge is calibrated, a steady-state heat flux can be measured at a single point on the stationary surface under investigation.

Figure 9:
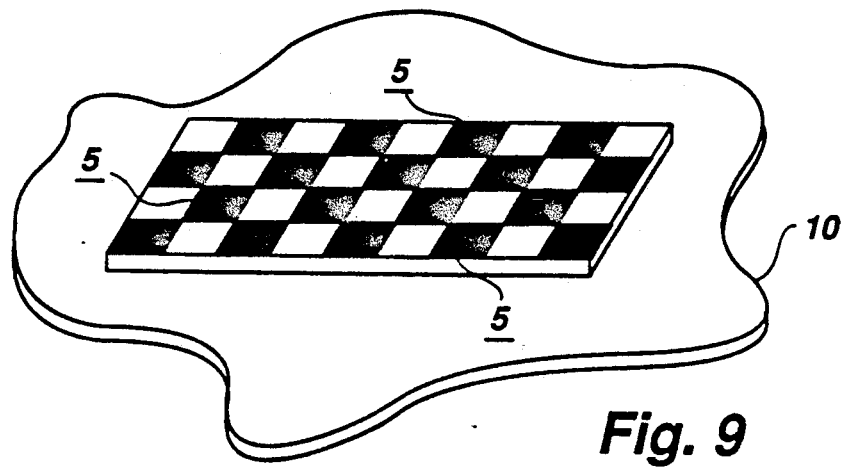
FIG. 9 is a a schematic representation of an embodiment of the present invention in which multiple phosphor heat flux gauges are positioned on a surface to determine spatial distribution of heat flux.

In another embodiment, many sensors 5 could be deposited on surface 10 to determine spatial distribution of heat flux. Such an arrangement is shown in FIG. 9. In this situation, the entire surface could be flooded with light. Or, the light from lamp 11 (FIG. 2) can be scanned across sensors 5 and the emissions from individual sensors 5 can be gathered. By this method, flux rates for discrete areas of surface 40 can be monitored.

In yet another embodiment (not illustrated), sensor 5 can be constructed so that light from lamp 11 (FIG. 2) does not have to pass through phosphor layer 16 in order to reach phosphor layer 12, allowing for more accurate temperature measurements. In this embodiment, using the numbering of components in FIG. 1, a checkerboard of individual phosphor layers 12 are applied to surface 10. A layer of insulator 14 is deposited over layers 12, and a checkerboard of phosphor layers 16, juxtaposed in relation to layers 12, is deposited over insulative buyer 14. This allows layers 12 to receive the full light available from lamp 11, except for the usual minor losses in insulative layer 14, while a continuous luminescence is produced by layers 12 and layers 16 to lens 22.

The foregoing description of embodiments of the present invention has been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

WHAT IS CLAIMED IS:

1. An optically interrogated gauge for measuring heat flux incident on a surface comprising:
   a first thermographic phosphor in direct contact with said surface;
   a second thermographic phosphor overlying and spaced apart from said first thermographic phosphor;
   thermal insulating means having a predetermined thickness and thermal conductivity between said first thermographic phosphor and said second thermographic phosphor for thermally isolating said first thermographic phosphor from said second thermographic phosphor;
   light means incident on said first and second thermographic phosphors, for producing first luminescence from said first thermographic phosphor and second luminescence from said second thermographic phosphor, wherein said first luminescence and said second luminescence are indicative of the temperatures of said first and second thermographic phosphors;
   collecting means for collecting said first and second luminescences; and
   computing means connected to said collecting means for determining heat flux on said plurality of points on said surface using numerical differences between said temperatures of said pluralities of first and second thermographic phosphors, and said thickness and thermal conductivity of said thermal insulating means.

2. The heat flux gauge is described in claim 1, wherein said thermal insulating means is transparent to light having wavelengths in the area of 254 nm.

3. The heat flux gauge is described in claim 1, wherein said thermal insulating means comprises polymethylpentene (PMP).

4. The heat flux gauge as described in claim 1, wherein said first thermographic phosphor comprises $Gd_2O_2S:Tb$.

5. The heat flux gauge as described in claim 1, wherein said second thermographic phosphor comprises $La_2O_2S:Eu$.

6. The heat flux gauge as described in claim 1, wherein said light means comprises a mercury lamp.

* * * * *